United States Patent Office 2,703,796
Patented Mar. 8, 1955

2,703,796

9-OXO-DEHYDROABIETIC ACID AND ESTERS

Paul F. Ritchie, Wilmington, Del., assignor to Hercules Powder Company, Wilmington, Del., a corporation of Delaware No Drawing. Application July 31, 1953,
Serial No. 371,720

10 Claims. (Cl. 260—99)

This invention relates to new chemical compounds derived from dehydroabietic acid and, more particularly, to octahydro-7-isopropenyl-1,4a-dimethyl-9-oxo - 1 - phenanthrenecarboxylic acid and esters thereof and the preparation of these new compounds.

In accordance with this invention, valuable new derivatives of dehydroabietic acid have been prepared wherein the isopropyl group in the 7-position of the dehydroabietic acid nucleus has been dehydrogenated to an isopropenyl group and the carbon in the 9-position has been oxidized to a keto group. The esters of 1,2,3,4,4a,9,10,10a-octahydro-7-isopropenyl-1,4a-dimethyl-9-oxo - 1 - phenanthrenecarboxylic acid may be prepared by the dehydration of an ester of 14-hydroxy-9-oxodehydroabietic acid, the latter compound having been prepared by the oxidation of the corresponding ester of dehydroabietic acid. The free acid, 1,2,3,4,4a,9,10,10a-octahydro - 7 - isopropenyl-1,4a-dimethyl-9-oxo-1-phenanthrenecarboxylic acid, may then be prepared by saponification of one of its esters.

The new compounds of this invention are believed to have the following structural formula:

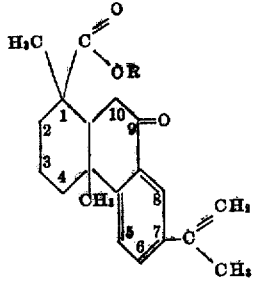

where R may be hydrogen, alkyl, hydroxyalkyl, cycloalkyl, aryl, or aralkyl.

The following examples will illustrate the preparation of the new compounds of this invention. All parts and percentages are by weight unless otherwise indicated.

Example 1

Methyl 14-hydroxy-9-oxodehydroabietate (6.4 parts) was dissolved in 75 parts of acetyl chloride and the solution was heated under reflux for 3 hours. After removal of the acetyl chloride under reduced pressure, the residue was dissolved in ether and the ethereal solution was then washed with water until neutral, dried with anhydrous sodium sulfate, and evaporated to dryness. The product (5.9 parts) was then adsorbed on a tower of alumina. Elution of the column with hexane removed 1.9 parts of a material which when crystallized from methanol melted at 81°–82° C. On recrystallization, the product had a constant melting point of 81.5°–82.5° C. A carbon and hydrogen analysis made on a sample of this product was in agreement with that calculated for the methyl ester of octahydro-7-isopropenyl-1,4a-dimethyl-9-oxo - 1 - phenanthrenecarboxylic acid. In order to prove the presence of the isopropenyl group in the 7-position, a sample of the above product was ozonized in ethyl chloride solution at −70° C. On decomposition of the ozonized product, there was obtained formaldehyde which was identified as the 2,4-dinitrophenylhydrazone and a product identified as the methyl ester of 7-acetyl-octahydro-1,4a-dimethyl-9-oxo-1-phenanthrenecarboxylic acid. The latter compound was shown to be the same as that obtained by another method of synthesis, namely, preparation of methyl 14-hydroperoxy-9-oxodehydroabietate and the decomposition thereof with a metallic salt. Further proof that this compound was the 7-isopropenyl-9-oxo compound was shown by the fact that the ultraviolet absorption spectrum was consistent with the above proposed structure for the product.

Example 2

Methyl 14-hydroxy-9-oxodehydroabietate (2.3 parts) was dissolved in 50 parts of acetyl chloride and the solution was boiled under reflux for 6 hours. The acetyl chloride was then distilled off, the final traces of it being removed under reduced pressure. The residue was then heated under reflux with 50 parts of collidine for 16 hours. The product was recovered by pouring this reaction mixture into several volumes of water and extracting the product with ether. The ethereal solution was washed with 5% hydrochloric acid and then with water. After removing the ether, the product was adsorbed on an alumina column. Elution of the column with benzene removed a blue fluorescent band which contained 0.15 part of material. Further elution with benzene removed 0.82 part of a material which was almost colorless and which crystallized from methanol with a melting point of 82°–83° C. The melting point of this product was not depressed when admixed with a sample of the product isolated in the above example.

Example 3

Methyl 14-hydroxy-9-oxodehydroabietate (4.5 parts) was dissolved in 50 parts of acetic anhydride and the solution was boiled under reflux for 2 hours. The reaction mixture was then poured into an excess of water and the product was extracted with ether. The ethereal solution was washed with 5% aqueous sodium bicarbonate solution, water, and finally after drying was evaporated to dryness. The product (4.4 parts) was then adsorbed on an alumina column and the column eluted with benzene to obtain 1.5 parts of a material which crystallized from methanol. After 3 recrystallizations, the compound melted at 81.5°–82.5° C.

Example 4

Five parts of the methyl ester of octahydro-7-isopropenyl-1,4a-dimethyl-9-oxo-1-phenanthrenecarboxylic acid was heated under reflux with 150 parts of diethylene glycol containing 3 parts of potassium hydroxide for 1.5 hours. The solution was diluted with 3 volumes of water and extracted with ether. The aqueous solution was then acidified with dilute hydrochloric acid and extracted with ether. This second ether extract was washed with water until neutral, dried in contact with anhydrous sodium sulfate, and evaporated to dryness. The product (4.5 parts) was crystallized from a mixture of benzene and petroleum ether and then was recrystallized twice from methanol. The crystals of the free acid so obtained sintered at 208°–212° C. and melted at 214°–216° C. The neutral equivalent was determined and found to be 314 (the calculated value for the free acid is 312). The elementary analysis of this product (carbon 76.68%; hydrogen 7.80%) showed it to be in agreement with that of octahydro-7-isopropenyl-1,4a-dimethyl-9-oxo - 1 - phenanthrenecarboxylic acid ($C_{20}H_{24}O_3$).

The new compounds of this invention may be prepared by the dehydration of an ester of 14-hydroxy-9-oxodehydroabietic acid. That they have the structural formula given above has been shown by the fact that the elementary analysis and ultraviolet absorption spectrum are in agreement with the proposed structure and furthermore has been shown by their method of preparation. Even more conclusive evidence supporting the proposed structure is afforded by the fact that on ozonization, formaldehyde is evolved and a ketone formed which is the same ketone formed when the corresponding ester of 14-hydroperoxy-9-oxodehydroabietic acid is reduced with a metallic catalyst to the ester of 7-acetyl-octahydro-1,4a-dimethyl-9-oxo-1-phenanthrenecarboxylic acid.

The esters of 14-hydroxy-9-oxodehydroabietic acid which are dehydrated to produce the new compounds of this invention may be prepared in a variety of ways. For example, they are produced in minor amounts when esters of dehydroabietic acid are oxidized in the molten state with oxygen in the presence of a metallic salt as catalyst. Another and possibly more practical method of producing the esters of 14-hydroxy-9-oxodehydroabietic acid is by the oxidation of an ester of dehydroabietic acid to the corresponding ester of 9-oxodehydroabietic acid, with the subsequent oxidation of the latter compound to the 14-hydroperoxy-9-oxo compound and reduction of the 14-hydroperoxy compound with a nonmetallic catalyst.

The first of these methods of oxidizing esters of dehydroabietic acid, that is, the metal catalyzed oxidation process, is carried out by passing an oxygen-containing gas through the ester in the molten state in the presence of a metallic compound. The temperature at which the oxidation is carried out must be at least that of the melting point of the ester being oxidized, as, for example, a temperature above about 62° C. in the case of methyl dehydroabietate, 30° C. in the case of ethyl dehydroabietate, 104° C. in the case of the glycerol ester of dehydroabietic acid, etc. In general, the temperature at which the oxidation of the alkyl dehydroabietate is carried out is from above the melting point of the ester to about 125° C., and preferably between about 65° C. and 100° C. Any compound of a metal capable of existing in more than one valence state may be used to catalyze this oxidation reaction provided that the metallic compound is at least slightly soluble in the reaction mixture. Of particular value are those metallic salts which are soluble in organic solvents and may then be added to or dissolved in the molten ester in the form of a solution of the metallic salt in an inert organic solvent. Exemplary of the metallic compounds which may be used are such salts as the chlorides, acetates, stearates, naphthenates, resinates, etc., of such metals as cobalt, iron, nickel, palladium, copper, cadmium, mercury, aluminum, tin, chromium, molybdenum, manganese, etc. Any amount of the metallic salt may be used but, in general, it will vary from a catalytic amount to about 5% based on the weight of the ester. The oxidation should be carried out until at least 1 mole of oxygen per mole of ester has been absorbed since at lower oxygen absorptions the oxidate is a mixture of the 9-oxo and 9-hydroxy-dehydroabietates and unoxidized ester. At oxygen absorptions of 1 mole of oxygen per mole of ester or higher, the oxidate is chiefly the 9-oxo compound and in addition contains small amounts of 14-hydroxy-9-oxodehydroabietate, the amount of the latter product being dependent upon the total degree of oxidation. The 9-oxodehydroabietate may be separated from the reaction mixture by countercurrent extraction with two immiscible solvents or by chromatographing the reaction mixture on alumina.

As already pointed out, esters of 9-oxodehydroabietic acid may also be prepared by the oxidation of an ester of dehydroabietic acid in liquid phase with oxygen and then reducing the hydroperoxide so obtained to the ketone. This oxidation process is most rapidly carried out by passing an oxygen-containing gas through the ester in the liquid state, that is, either molten or dissolved in an inert solvent. Any gas containing free oxygen may be used for carrying out the oxidation, as, for example, molecular oxygen or air. The temperature at which the oxidation is carried out will depend upon the reaction conditions. For example, if it is carried out in the absence of a solvent, the temperature must be at least that of the melting point of the ester being oxidized, as, for example, above about 62° C. in the case of methyl dehydroabietate, 30° C. in the case of ethyl dehydroabietate, etc. If a solution of the ester is used, as, for example, tert-butyl benzene, lower temperatures may be used for the oxidation. In general, the oxidation is carried out at a temperature between about 60° C. and 130° C., and preferably between about 65° C. and about 100° C. This oxidation is preferably carried out in the presence of a free radical oxidation initiator, i. e., a material which undergoes thermal decomposition to form free radicals under the reaction conditions. Of particular value are the peroxidic free radical oxidation initiators such as organic peroxides and organic hydroperoxides which form free radicals under the reaction conditions. Exemplary of the peroxidic compounds which may be used are acetyl peroxide, benzoyl peroxide, tert-butyl peroxide, methyl ethyl peroxide, tert-butyl hydroperoxide, α,α-dimethylbenzyl hydroperoxide, naphthene hydroperoxides, etc. The oxidate so obtained and containing the ester of 9-hydroperoxydehydroabietic acid is then subjected to reduction with a metallic reducing agent to produce the 9-oxodehydroabietate. Any metallic compound containing a metallic atom which is capable of acting as a reducing agent, i. e., which exists in more than one valence state and is in one of its lower valence states and is capable of being oxidized to one of its higher valence states, may be employed. Exemplary of such metallic reducing agents are the sulfates, nitrates, chlorides, naphthenates, acetates, etc., of iron, cobalt, nickel, manganese, chromium, tin, lead, mercury, copper, etc., wherein the metallic ion is in one of its lower oxidation states. The metallic reducing agent is preferably one which is water-soluble. The reduction is most easily carried out by adding a solution of the metallic reducing agent to a solution of the 9-hydroperoxydehydroabietate in an inert solvent which is preferably one in which ionization is possible. Solvents which may be used for this purpose are aqueous alcohol, acetone, dioxane, etc. The esters of 9-oxodehydroabietic acid are then obtained from the reduction reaction mixture by pouring the latter into water and extracting the organic product by means of ether or some other water-immiscible solvent.

The esters of 14-hydroperoxy-9-oxodehydroabietic acid which are then reduced to produce the 14-hydroxy compounds may be prepared by the oxidation of the 9-oxodehydroabietate with an oxygen-containing gas in the presence of a free radical oxidation initiator in the same manner as that described above for the preparation of esters of 9-hydroperoxydehydroabietic acid. In the event that the oxidation is carried out on the molten ester, the temperature at which the oxidation is carried out must also be above the melting point of the ester, that is, for example, above about 68° C. in the case of methyl 9-oxodehydroabietate, etc.

The 14-hydroxy compound is then prepared from the 14-hydroperoxide by contacting the latter compound with a reducing agent. Either a metallic or nonmetallic reducing agent may be used. However, the nonmetallic reducing agents are preferred since the product obtained with these reducing agents is almost entirely the 14-hydroxy compound, whereas when metallic reducing agents are used, there is formed some 7-acetyl-octahydro-1, 4a-dimethyl-9-oxo-1-phenanthrenecarboxylic acid ester along with the 14-hydroxy-9-oxodehydroabietate. Hence larger yields are obtained with the nonmetallic reducing agents. By the term "nonmetallic reducing agent" is meant compounds of nonmetals which exist in more than one valence state and in which the nonmetal is present in one of its lower valence states and is capable of being oxidized to one of its higher valence states. Exemplary of such nonmetallic reducing agents are the sulfide, mono-, di-, and polysulfide and mixtures thereof, sulfite, bisulfite, iodide, etc., anions. The nonmetallic reducing agent is preferably a water-soluble salt such as the alkali metal, alkaline earth metal, and ammonium salts of these nonmetallic reducing anions.

The reduction of the 14-hydroperoxide compound or the oxidate containing this hydroperoxide is preferably carried out in solution. Any inert solvent may be used for carrying out the reduction reaction but is preferably a polar solvent, that is, one in which ionization is possible. Any solvent in which both the hydroperoxide and reducing agent are soluble may be used, as, for example, aqueous methanol, ethanol, propanol, isopropanol, acetone, dioxane, etc. The reaction may also be carried out in a two-phase system, the hydroperoxide being dissolved in a solvent for it, such as diethyl ether, and this solution then intimately contacted with an aqueous solution of the reducing agent. The amount of solvent used may be varied over a wide range but should be sufficient to insure that the reaction mixture is homogeneous. Usually the hydroperoxide is dissolved in an amount of solvent to obtain a solution of about 1% to about 10% concentration.

The amount of reducing agent used in the process of this invention to obtain the alcohol from the hydroperoxide may be varied over a wide range, but preferably is an amount sufficient to provide one electron for each hydroperoxy radical to be reduced to the alcohol. Greater amounts of the reducing agent may be added if desired but is, of course, not necessary. The temperature at which the reduction reaction is carried out will depend upon the reducing agent being used, the solvent, etc. In general, a temperature of from about 0° C. to about 100°

C., and preferably from about 20° C. to about 100° C., is used.

The dehydration of the esters of 14-hydroxy-9-oxodehydroabietic acid to the new compounds of this invention, that is, the esters of 1,2,3,4,4a,9,10,10a-octahydro-7-isopropenyl - 1,4a - dimethyl - 9 - oxo - 1 - phenanthrenecarboxylic acid, may be carried out by treatment with a dehydrating agent. Any agent capable of dehydrating a tertiary alcohol may be used. The foregoing examples have illustrated the dehydration by means of acetic anhydride, acetyl chloride, and acetyl chloride followed by treatment with collidine. Other dehydration agents which may be used are potasium acid sulfate or oxalic acid or thionyl chloride followed by treatment with pyridine. Excellent results are obtained by the use of acetic anhydride or acetyl chloride as the dehydration agents and thus these are the preferred dehydration agents for the preparation of the new compounds of this invention.

The temperature at which the dehydration reaction is carried out will depend upon the dehydrating agent used. For example, with acetic anhydride or potassium acid sulfate, the dehydration is carried out at a temperature of from about 75° C. to about 140° C., with oxalic acid a temperature of from about 100° C. to about 150° C. is used, with acetyl chloride a temperature of from about 25° C. to about 55° C. is used, and with the thionyl chloride and pyridine treatment the reaction is carried out at a temperature of from about —10° C. to about 25° C. Thus, the reaction will, in general, be carried out at a temperature within the range of from about —10° C. to about 150° C.

While the foregoing examples have shown the preparation of methyl octahydro-7-isopropenyl-1,4a-dimethyl-9-oxo-1-phenanthrenecarboxylic acid, any other alkyl, hydroxyalkyl, cycloalkyl, aryl, or aralkyl ester of octahydro-7 - isopropenyl - 1,4a - dimethyl - 9 - oxo - 1 - phenanthrenecarboxylic acid may be prepared in like manner. For example, ethyl, propyl, butyl, hydroxyethyl, glycerol, cyclohexyl, benzyl, etc., 14 - hydroxy - 9 - oxodehydroabietates may be dehydrated to produce the 7-isopropenyl compound in accordance with this invention.

The free acid, 1,2,3,4,4a,9,10,10a-octahydro-7-isopropenyl - 1,4a - dimethyl - 9 - oxo - 1 - phenathrenecarboxylic acid, is readily obtained from one of the esters produced as described above by saponification thereof. Any of the usual methods of carrying out the saponification normally employed in the preparation of an acid from an ester may be used.

The new products of this invention having an isopropenyl group in the 7-position and an oxo group in the 9-position of the dehydroabietic acid nucleus are valuable intermediates in the synthesis of new derivatives of the resin acids, pharmaceuticals, dyestuffs, etc. For example, they may be oxidized with ozone to yield the corresponding esters of 7-acetyl-octahydro-1, 4a-dimethyl-9-oxo-1-phenanthrenecarboxylic acid, which esters are useful as latent crystalline plasticizers in neoprene delayed tack adhesives. In addition, the new esters of this invention, having as isopropenyl group in the 7-position may be co-polymerized with other ethylenically unsaturated monomers to produce valuble new copolymers. The following example will illustrate their use in the preparation of such a copolymer.

*Example 5*

A regular GR–S polymerization was carried out wherein part of the styrene was replaced with the methyl ester of octahydro - 7 - isopropenyl - 1,4a - dimethyl - 9 - oxo - 1 - phenanthrenecarboxylic acid. A polymerization vessel was charged in the usual manner with the following ingredients and a control was run wherein the 7-isopropenyl compound was omitted.

|  | Parts | |
|---|---|---|
|  | Example | Control |
| Butadiene | 72 | 72 |
| Styrene | 18 | 28 |
| The 7-isopropenyl compound | 10 | |
| Water | 180 | 180 |
| Potassium persulfate | 0.3 | 0.3 |
| Sodium salt of disproportionated rosin | 5.0 | 5.0 |
| Mixed tertiary mercaptan (chiefly $C_{12}$) | 0.4 | 0.4 |

These polymerization mixtures were held at 40° C. for 26½ hours. Both polymerized at the same rate and produced normal GR–S lattices. The unreacted butadiene was bled off, 0.2 part of hydroquinone in water was added as a short stopper, and 1 part of phenyl β-naphthylamine in aqueous dispersion was added as an antioxidant. The conversion, as determined on an aliquot, was 62.7% for the example and 61.9% for the control. The polymer was precipitated by addition of excess 1% sulfuric acid and then dried. The modified GR–S polymer had a specific viscosity (1% solution in benzene) of 2.10 and the control 2.29. An aliquot of the modified polymer was purified by dissolving in benzene and reprecipitating in methanol, which process was repeated twice to take out any unbound rosin monomer. An ultraviolet analysis showed that the product contained 8% of the 7-isopropenyl compound. This polymer had better physical properties, particularly it had better elasticity than the control GR–S even though it was a lower viscosity polymer. In fact, it had the properties of "cold rubber."

Thus, the new esters of this invention may be used as a partial replacement for styrene in a standard GR–S formulation and obtain a rubber whose properties approach those of the so-called "cold rubber" without the necessity of resorting to cold rubber techniques. Obviously this is an important use of the new compounds of this invention. Many other uses for these new products will be apparent to one skilled in the art.

This application is a continuation-in-part of my application Serial No. 251,253, filed October 13, 1951, now abandoned.

What I claim and desire to protect by Letters Patent is:

1. A phenanthrenecarboxylic acid derivative selected from the group consisting of 1,2,3,4,4a,9,10,10a-octahydro - 7 - isopropenyl - 1,4a - dimethyl - 9 - oxo - 1- phenanthrenecarboxylic acid and esters thereof.

2. 1,2,3,4,4a,9,10,10a - octahydro - 7 - isopropenyl-1,4a-dimethyl-9-oxo-1-phenanthrenecarboxylic acid.

3. An ester of 1,2,3,4,4a,9,10,10a-octahydro-7-iscopropenyl - 1,4a - dimethyl - 9 - oxo - 1 - phenanthrenecarboxylic acid.

4. An alkyl ester of 1,2,3,4,4a,9,10,10a-octahydro-7-isopropenyl - 1,4a - dimethyl - 9 - oxo - 1 - phenanthrenecarboxylic acid.

5. The methyl ester of 1,2,3,4,4a,9,10,10a-octahydro-7 - isopropenyl - 1,4a - dimethyl - 9 - oxo - 1 - phenanthrenecarboxylic acid.

6. The process of preparing an ester of 1,2,3,4,4a,9,10,10a-octahydro - 7 - isopropenyl - 1,4a - dimethyl - 9 - oxo-1-phenanthrenecarboxylic acid which comprises treating an ester of 14-hydroxy-9-oxodehydroabietic acid with a dehydrating agent at a temperature of from about —10° C. to about 150° C.

7. The process of preparing an ester of 1,2,3,4,4a,9,10,-10a, octahydro - 7 - isopropenyl - 1,4a - dimethyl - 9 - oxo-1-phenanthrenecarboxylic acid which comprises treating an ester of 14-hydroxy-9-oxodehydroabietic acid with acetic anhydride at a temperature of from about 75° C. to about 140° C.

8. The process of preparing an ester of 1,2,3,4,4a,9,10, 10a - octahydro - 7 - isopropenyl - 1,4a - dimethyl - 9 - oxo-1-phenanthrenecarboxylic acid which comprises treating an ester of 14-hydroxy-9-oxodehydroabietic acid with acetyl chloride at a temperature of from about 25° C. to about 55° C.

9. The process of preparing the methyl ester of 1,2,3,4, 4a,9,10,10a -octahydro - 7 - isopropenyl - 1,4a - dimethyl-9 - oxo - 1 - phenanthrenecarboxylic acid which comprises treating methyl 14-hydroxy-9-oxodehydroabietate with acetic anhydride at a temperature of from about 75° C. to about 140° C.

10. The process of preparing the methyl ester of 1,2,3, 4,4a,9,10,10a - octahydro - 7 - isopropenyl - 1,4a - dimethyl - 9 - oxo - 1 - phenanthrenecarboxylic acid which comprises treating methyl 14 - hydroxy - 9 - oxodehydroabietate with acetyl chloride at a temperature of from about 25° C. to about 55° C.

No references cited.

UNITED STATES PATENT OFFICE

CERTIFICATE OF CORRECTION

Patent No. 2,703,796　　　　　　　　　　　　　　　　　March 8, 1955

Paul F. Ritchie

It is hereby certified that error appears in the printed specification of the above numbered patent requiring correction and that the said Letters Patent should read as corrected below.

Column 3, line 55, for "rapidly" read --readily--; column 5, line 13, for "potasium" read ----potassium--; line 43, for "-phenathrenecar-" read -- -phenanthrenecar- --; line 59, for "as" read --an--; column 6, line 38, for "-iscopro-" read -- -isopro- --; line 54, for "10a, octahydro-" read -- 10a-octahydro- --.

Signed and sealed this 5th day of April, 1955.

(SEAL)
Attest:
E. J. MURRY

Attesting Officer

ROBERT C. WATSON
Commissioner of Patents